US005673202A

United States Patent [19]

Baldenweg et al.

[11] Patent Number: 5,673,202

[45] Date of Patent: Sep. 30, 1997

[54] SYSTEM FOR MINIMIZING THE ENERGY CONSUMPTION OF AN ELECTRICAL LOAD

[75] Inventors: Urs Baldenweg, Seuzach; Beat Sauter, Ermatingen, both of Switzerland

[73] Assignee: Energy Management Team AG, Frauenfeld, Switzerland

[21] Appl. No.: 416,685

[22] PCT Filed: Sep. 2, 1994

[86] PCT No.: PCT/CH94/00172

§ 371 Date: Apr. 7, 1995

§ 102(e) Date: Apr. 7, 1995

[87] PCT Pub. No.: WO95/07500

PCT Pub. Date: Mar. 16, 1995

[30] Foreign Application Priority Data

| | | | |
|---|---|---|---|
| Sep. 4, 1993 | [CH] | Switzerland | 02709/93 |
| Aug. 31, 1994 | [CH] | Switzerland | 02663/94 |

[51] Int. Cl.$^{6}$ .............................. G06F 1/32; G04G 15/00

[52] U.S. Cl. ........................... 364/492; 364/480; 364/707

[58] Field of Search .................................... 364/492, 480, 364/493, 707; 395/750; 355/208

[56] References Cited

U.S. PATENT DOCUMENTS

| | | | |
|---|---|---|---|
| 4,819,180 | 4/1989 | Hedman et al. | 364/492 |
| 5,170,159 | 12/1992 | Kawabata et al. . | |
| 5,194,895 | 3/1993 | Bares | 355/208 |
| 5,504,907 | 4/1996 | Stewart et al. | 395/750 |
| 5,542,035 | 7/1996 | Kikinis et al. | 395/750 |

FOREIGN PATENT DOCUMENTS

| | | |
|---|---|---|
| 0376409 | 7/1990 | European Pat. Off. . |
| 2483579 | 12/1981 | France . |
| 2560387 | 8/1985 | France . |
| 8905161 | 9/1989 | Germany . |
| 61-145479 | 7/1986 | Japan . |
| 61-145480 | 7/1986 | Japan . |
| 61-145481 | 7/1986 | Japan . |
| 1326891 | 7/1987 | U.S.S.R. . |
| 2146797 | 4/1985 | United Kingdom . |

*Primary Examiner*—Emanuel T. Voeltz
*Assistant Examiner*—M. Kemper
*Attorney, Agent, or Firm*—Panitch Schwarze Jacobs & Nadel, P.C.

[57] ABSTRACT

A controlling device is operated continuously throughout the day to minimize the energy consumption of an electrical load. The controlling device processes at least one primary measured value and at least one primary nominal value to obtain a control value. The control value is output by the controlling device for controlling the flow of energy to the electrical load throughout the day. The at least one primary nominal value is adjusted for individual conditions occurring throughout the day by using an output obtained by processing at least one secondary measured value and at least one secondary nominal value. The at least one secondary measured value is influenced by a user. The energy consumption of the electrical load is minimized while the comfort level of the electrical load (i.e., readiness of the electrical load when usage is expected) is maximized or optimized.

14 Claims, 4 Drawing Sheets

SYSTEM FOR MINIMIZING THE ENERGY CONSUMPTION OF AN ELECTRICAL LOAD

Figure 1:
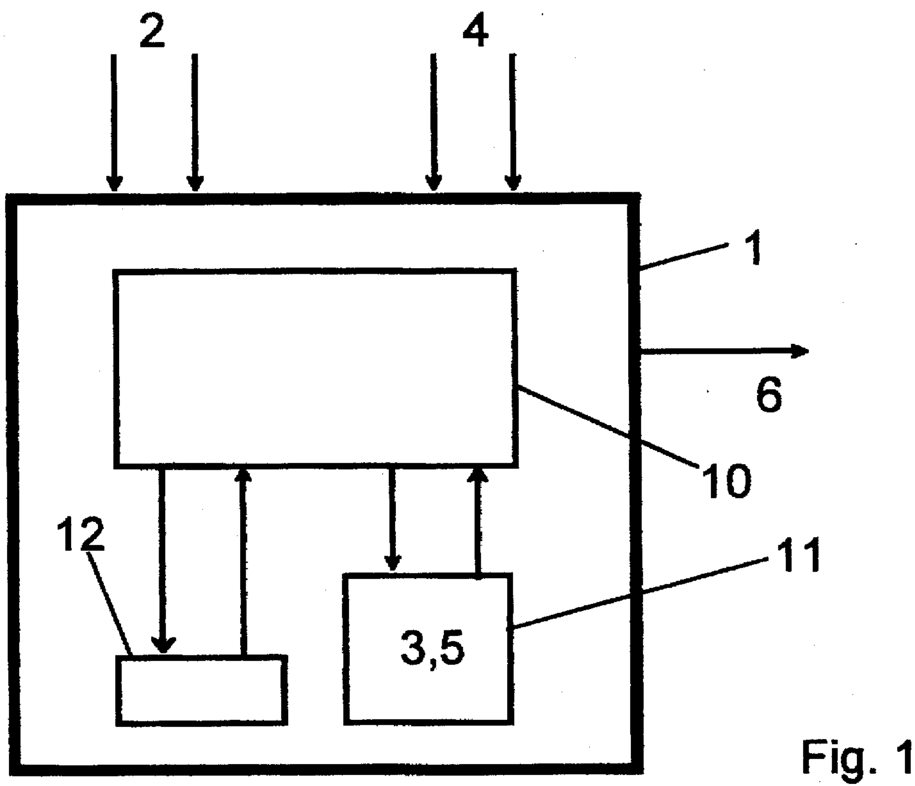

The invention relates to a process and a controlling device employed to minimise the energy consumption of an electrical load as described in the preamble of claims 1, 8 and 10. The per capita energy consumption of the population has increased dramatically since the beginning of industrialisation and continues to rise. The direct and indirect consequences of this development are difficult to predict. Simply the fact that today's society must rely on exhaustible energy resources such as oil or coal and is not capable of living in balance with nature requires appropriate steps towards reducing the consumption of energy.

A reduction in the consumption of energy can be attained in various ways: by sacrificing output, which also means sacrificing comfort; by improving the efficiency dining conversion or transport of energy; and by avoiding useless waste of energy.

Various devices and methods already exist which are designed to avoid poorly utilised energy in electrical energy consumers. In the following report, the term "electrical load" or simply "load" will be used synonymously with "electrical energy consumers." The aforesaid electrical energy consumers are various electrically supplied elements 8 or appliances 20, for example incandescent lamps, fluorescent lamps, beverage dispensers, copy machines, computers, electric motors, heating elements, cooking ranges etc.

The following examples illustrate how wasteful energy consumption can be avoided:

- by turning off appliances when they are no longer in use. In this case, the flow of energy to the electrical load can be interrupted manually, for example by operating a switch, or automatically, for example by using a relay;
- by dimming lighting to a minimal necessary degree of brightness. This throttles the flow of energy to the load to the necessary minimal degree.

It is well-known that copy machines or laser printers lose a relatively high amount of energy in stand-by mode. One possibility to reduce wasted energy in this case is, for example, the use of a timer which automatically switches off the machine when it is most probably not in use. However, even in this case there is still a considerable amount of inefficiently used energy. The Ravel-Handbook "Strom rationell nutzen; Umfassendes Grundwissen und praktischer Leitfaden zur rationellen Verwendung von Elektrizität", published by BfK/vdf 1992, states on page 249 that the newest machines can automatically shift into a state with a low energy consumption level after an adjustable delay following a use. This enables energy to be conserved during periods of low usage. However, if the machine is used during this time, it will take longer for the machine to warm up, causing a longer wait.

In order to avoid wasteful use of energy, it must first be decided whether the energy consumed is utilised or not and whether the conservation of wasted energy leads to a tolerable or intolerable loss of comfort. Most conventional methods offer insufficient information about the actual need of energy or the existing information is not sufficiently applied in order to minimise the amount of energy consumed.

The object of this invention is to specify a process and to create a controlling device 1, which minimise the energy consumption of a load 8, 20 by reducing the mount of consumed but not utilised energy to a minimum, in such a way that the loss in comfort due to conservation is tolerable.

This object will be accomplished by the process and controlling device 1 as they are defined in the claims.

According to the invention the energy consumed but not utilised by an electrical load 8, 20 will be minimised by regulating the energy flow to load 8, 20. This is achieved by applying a learning process to individual factors in the relation between well and poorly utilised energy.

The basis of the invented procedure lies therein that the flow of energy to load 8, 20 is regulated automatically with the help of controlling device 1 by converting at least one primary measured value 2 and at least one primary nominal value 3 to a control value 6 which is used to control the flow of energy to load 8, 20. In addition, controlling device 1 possesses means with which a user can manually interfere the procedure. Such a manual interference can possibly lead to the user dominance over the automatic controlling device 1. The user's interference supplies information about usage. Controlling device 1 detects the interference in the form of at least one secondary measured value 4 and converts the interference with at least one secondary nominal value 5 into a change in the primary nominal value 3. This procedure brings about a correction of the primary nominal value 3 which is adjusted to the individual circumstances. The correction causes the flow of energy to be controlled in such a manner that the energy consumed remains minimal and the comfort remains sufficient.

Figure 2:
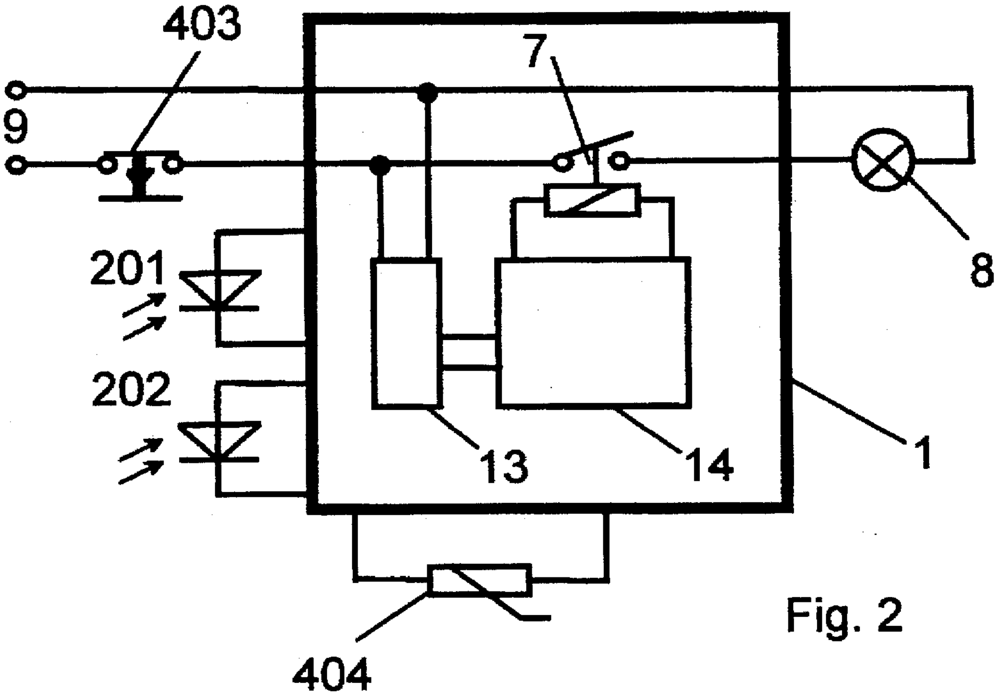
Figure 3:
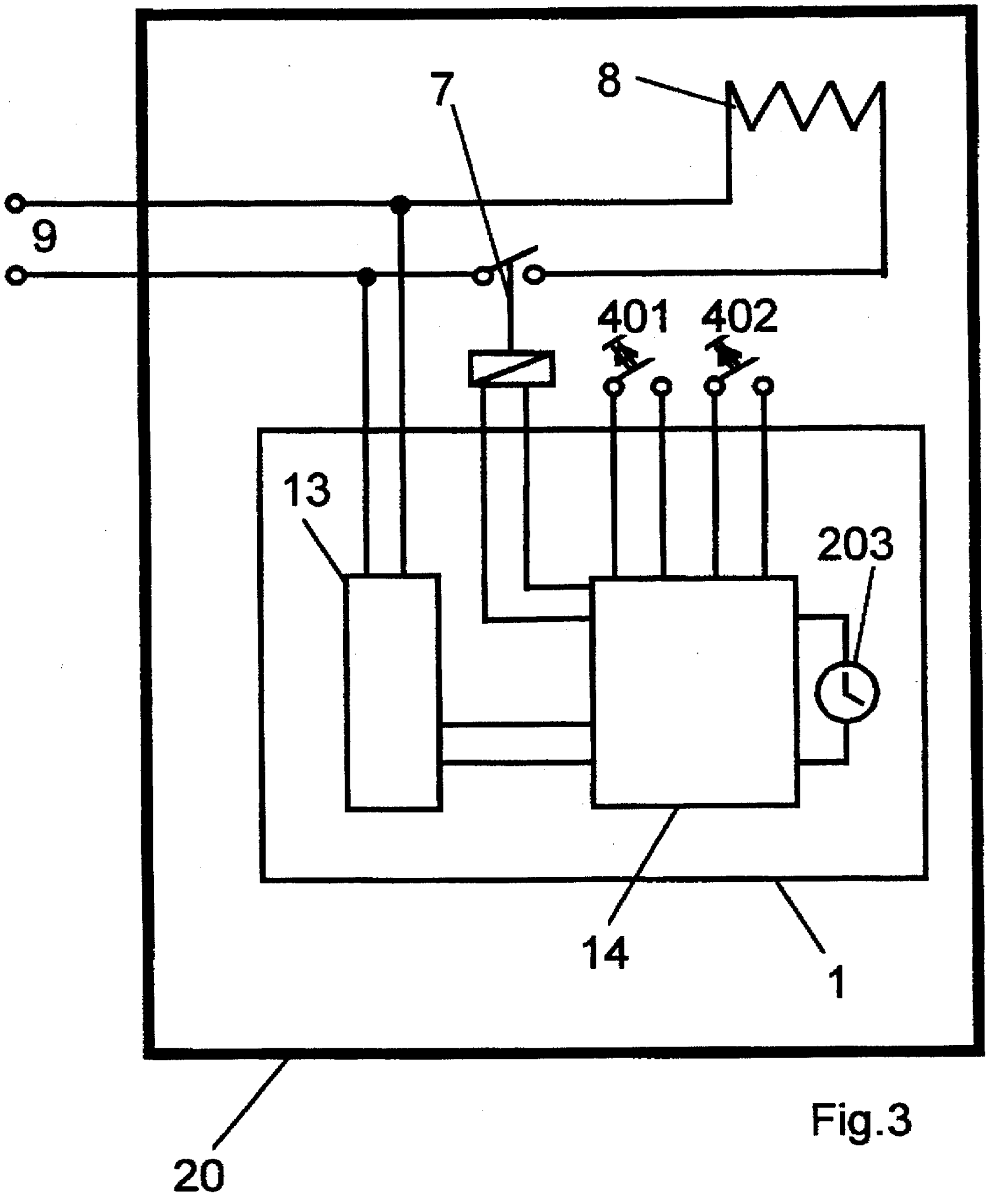
Figures 4A, 4B, 4C, 4D:
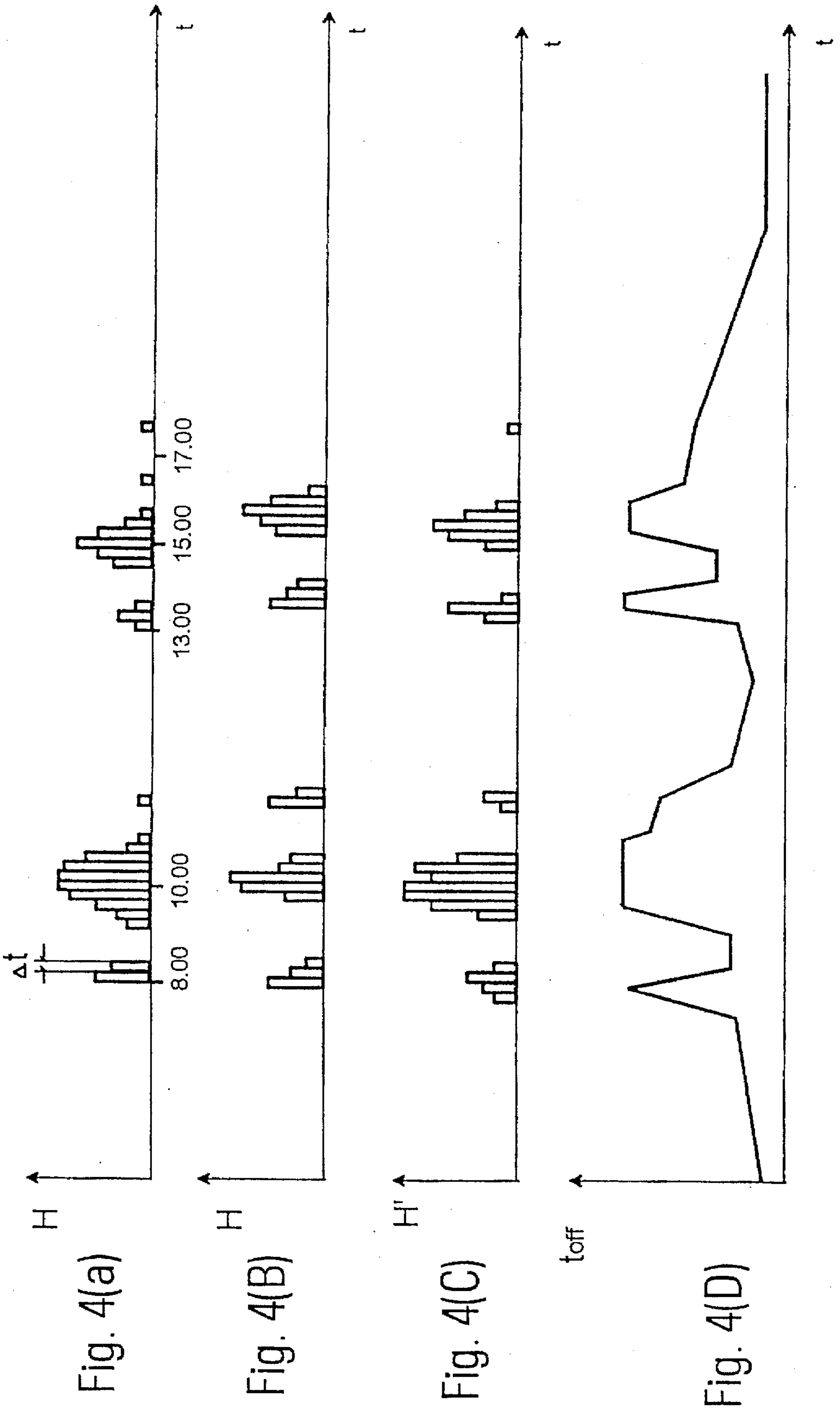
Figure 5:
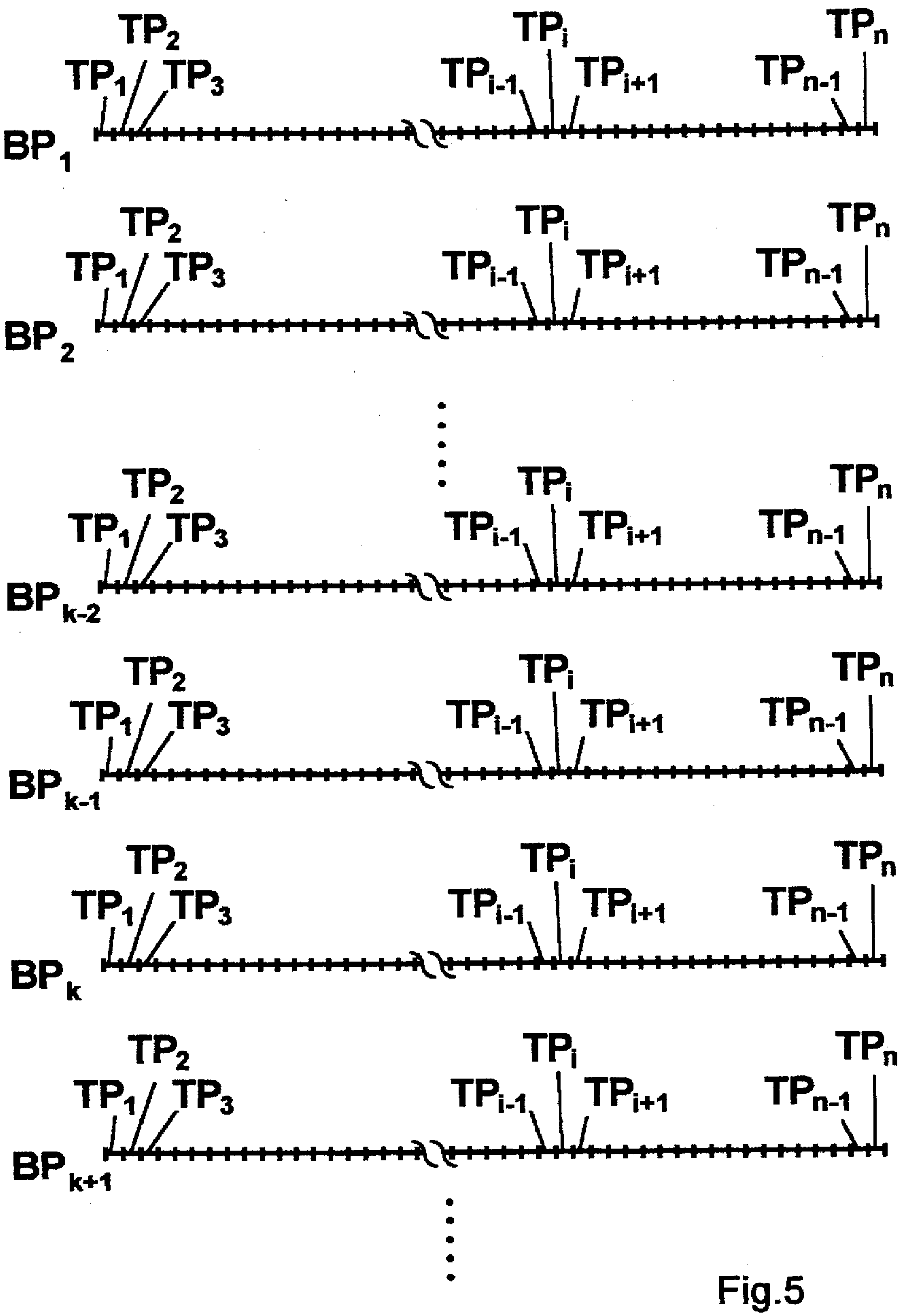

Several examples and the following figures serve to illustrate the invented process as well as controlling device 1 in detail:

FIG. 1 an exemplary application of the invented controlling device 1;

FIG. 2 a further possible application of the invented controlling device 1 as, for example, a steering mechanism for a lighting control system;

FIG. 3 an exemplary application of the invented controlling device 1 as ist may be used in a coffee machine 20;

FIG. 4 a scheme to illustrate the procedure in controlling coffee machine 20 as is proposed by the invention. The first two diagrams show the frequency of use H for two different days. The third diagram shows the average value H' of the frequency of use from several previous days. The final diagram shows the established temporal pattern for the delay in switching off $t_{off}$;

FIG. 5 a scheme to illustrate a further procedure used in controlling coffee machine 20 as described by the invention in which various consecutive periods of use $BP_1, BP_2, \ldots, BP_{k-2}, BP_{k-1}, BP_k, BP_{k+1}, \ldots$ are listed. Each of these periods of use is subdivided into equal partial periods $TP_1, TP_2, \ldots, TP_n$.

The following situations show where energy is poorly utilised, how a reduction of poorly utilised energy can be gained with conventional devices and processes and how these can be improved upon by employing the invented process which brings about a larger amount of conserved energy and/or reduces the loss of comfort.

It has already been mentioned that copy machines often automatically turn off after an adjustable time of delay. The loss of comfort in comparison to continuos operation lies in the longer waits which must be taken into account when the machine is used after the time of delay has expired. An improvement is possible if the delay in switching off is not preset by a user, but rather if the delay is established automatically by controlling device 1 from sensed and stored frequencies of use, which represent a secondary measured value 4, and from pre-defined reasonable delays for certain frequencies of use, the delays representing a secondary nominal value 5. Thus the delay in switching off is adjusted to individual demands by employing a learning process. To rephrase, on the basis of the registered pattern of user frequency, controlling device 1 adjusts the time of the delay in switching off the machine during times of high or intermediate frequency of use in such a way that in most cases no waiting period arises. The device also reduces the time of delay in switching off during times of low use, causing a wait during these periods which must be taken into account for the sake of conserving energy.

As a rule, beverages dispensers, for example coffee machine 20, are not supplied with devices to reduce poorly used energy. The application of the invented process in such situations enables the independent detection of various states of usage. This can be achieved, for example, by repeatedly registering the number of uses during a fixed interval. On the basis of this data, the frequency of use can henceforth be related to various conditions of use, for example no usage, low, intermediate or high frequency of use.

The association of these conditions of use with clock time 203 enables the independent detection of characteristic times of use. Thus it becomes possible, for instance, for the machine to remain on during intervals of high usage. In the same way, machine 20 can automatically switch off after a brief delay during intervals of low usage. If a change in the characteristic times of use should occur, controlling device 1 automatically recognises this, according to the invention, through stored information about the typical pattern of use and automatically adjusts to the new situation. The following example demonstrates the application of the invented process in the case of a coffee machine 20. FIGS. 3 and 4 illustrate the process:

Supply 9 in coffee machine 20 is issued through regulating unit 7, which is controlled by a microcontroller 10 in controlling device 1. Briefly operating main switch 401 causes the procedure to turn the supply voltage in machine 20 on and off. If supply 9 in machine 20 is interrupted by regulating unit 7 the procedure also allows supply 9 to be switched on via regulating unit 7 upon operating beverage request button 402. Utilisation information on the status of beverage request button 402, as secondary measured value 4, is registered as a function of time, which has been set by a real-lime clock 203 and which is to be understood as primary measured value 2. The use of a non-volatile memory medium 12, for example an EEPROM, guaranties that the stored information remains intact in the case of an electrical power failure.

The procedure autonomously establishes a characteristic pattern of the time of delay $t_{off}$ in contingency to the time of day t. This pattern of the time of delay is a primary nominal value 3. When machine 20 is in operation, time $t_{off}$ will be observed after beverage request button 402 has been operated until the procedure interrupts supply 9 for machine 20 at regulating unit 7.

Detection of function $t_{off}$ (t) as primary nominal value 3 occurs as follows: The 24 hours of a day are divided into equal intervals of width Δt. The procedure accumulates a set of data for each day. Within the set of data, the frequency of use H of beverage request button 402 during the interval of time and the status of regulating unit 7 are delegated unequivocally to each interval of time. The set of data represents a secondary measured value 4. In the following, an exemplary set of data is described in which the sequence in the parenthesis is always: interval number I, number of operations H of beverage request button 402 during interval I, status of regulating unit 7: (1,0,0), (2,0,0), (3,3,0), (4,0,1), (5,0,0), (6,5,0), (7,8,1), (8,12,1), . . . (120,0,0).

This set of data is stored in a EEPROM 12. The procedure forms further such sets of data on the following days and stores them in memory 12. The oldest stored set of data is replaced by the most current set of data after a fixed number of days has expired which was pre-set in the procedure. The procedure forms a set of data with the average values for H'(I) from all available sets of data at the end of each day and stores the new set in memory 12. The procedure establishes function $t_{off}$(t) from this set of data according to a regulation which is defined in the procedure as secondary nominal value 5.

This function is a primary nominal value 3. The function regulates the necessary delay at all times until the supply voltage of machine 20 is switched off. The procedure interrupts the supply 9 of machine 20 by means of regulating unit 7 after $t_{off}$(t) has expired following the last operation of beverage request button 402 at time t.

FIGS. 3 and 5 illustrate a further example for use in a coffee machine or beverage dispenser 20 which shows how the invented process as primary nominal value 3 determines the times of switching on and off for machine 20 or for parts 8 of machine 20. Supply 9 of machine 20 is issued through regulating unit 7 of controlling device 1. The controlling device itself is linked to the machine's control system in such a manner that it receives a control impulse each time the machine is operated. The main switch 401 is also connected to controlling device 1.

Machine 20 can be switched on manually whenever it is not in operation by briefly activating main switch 401. The system cycle of a micro controller 10 serves as basis of time 203. Controlling device 1 subdivides a designated typical period of use BP, for example one week, into a fixed mount n of equal partial periods TP. The length of TP is fixed at 6 minutes in the example at hand. Information is stored in memory 12 for each time interval TP during two periods of use BP. This information reveals whether the machine was operated during the corresponding interval. The procedure repeats after the two periods of use expire, in the course of which the oldest information stored is overstriked.

After controlling device 1 has been installed in machine 20, memory 12 is initialised so that the stored information reveals that no use occurred during each of the 2*n* partial periods. Such an initialisation of the memory can be attained by, for example, using a button which was designed for this purpose. The process itself can also cause the initialisation of the memory if the operational voltage of micro controller 10 sinks below a minimal value. If a suitable buffering in the operational voltage is present, the initialisation will not take place immediately after a power loss in supply 9, but after a considerable time of delay has expired. Thus, the stored data is guaranteed not to be erased even in the case of a power failure.

Machine 20 can be mined on simply by operating the main switch 401 briefly after memory 12 has been initialised. Controlling device 1 registers if machine 20 does not dispense any beverages within a fixed mount of time by the absence of control impulses from the machine's control system. In this case the procedure will turn off machine 20 by means of regulating unit 7, which has been designated this purpose.

This type of switching off occurs not only after the memory has been initialised, but in general after a set mount of time has elapsed after the last beverage was dispensed.

Machine 20 can be switched on in the following ways:

Manually, by briefly operating main switch 401;

Automatically at the beginning of partial period $TP_i$ of the actual period of use $BP_k$, in case the machine was used in the previous partial period $TP_{i-1}$ of one of the former periods of use $BP_{k-1}$ or $BP_{k-2}$.

It is clear that after an initial learning process controlling device 1 assumes the management of the times in which the machine is switched on and off. The defined controlling device 1 is superior to a conventional timer in that no programming of optimal switching times is necessary and the optimal switching times are dictated independently by controlling device 1. In addition, the invented controlling device 1 is flexible and can act automatically to changing user habits. Furthermore, no manual operations are required in, for example, resetting the clock from standard time to daylight saving time.

The defined procedure, by which the switching on and off is adjusted to individual demands as primary nominal value 3, can naturally be further refined. For instance, controlling device 1 recognises the occurrence of long breaks in usage as they can occur on a weekend or during vacation. This mechanism allows controlling device 1 to adjust to current conditions in such situations by taming the machine on again after a weekend or by not erasing the stored pattern of use during vacations. In a further variation of the application of controlling device 1 in coffee machine 20, the connections between controlling device 1 and the machine's control system to can be dispensed with. In this case the procedure traces information about the use of the machine by means of a measured value 4, which corresponds to the current power input of machine 20. Thus the procedure recognises, for example whether machine 20 was previously used on the basis of the duration of the warm-up times with high output. This process is used advantageously when the controlling device 1 is serially connected before machine 20.

The following example depicts how the invented process can be used to reduce energy consumption in a lighting system. There is considerable potential for conserving energy in lighting system, especially those in offices. The lights often remain in operation even when the illumination of the rooms resulting from daylight or other sources of light or a combination of both would be sufficient.

Lights are manually operated if required when no device has been installed which automatically influences lighting. A lighting system will, as a role, remain in operation even when the lighting conditions change making no further illumination necessary. Some possible reasons for this are: it is not immediately noticed that the change in the lighting conditions would allow the lighting system to be mined off; the responsibility for turning off the lights when several users are concerned is unclear; or the users are insufficiently aware of the need to conserve energy and, especially with low energy prices, insufficiently sensitive to cost.

There are already devices on the market which reduce the amount of energy consumed in lighting systems, all having various disadvantages. For instance, dimming switches are equipped with light sensors. When the measured brightness, which serves as measured value 2, sinks below a given value, which is a primary nominal value 3, the lighting switches on; when the measured brightness exceeds a further given value the lighting switches off again. In such a case, the brightness sensor must be installed so that it is as little as possible within the sphere of influence of the controlled lights. This type of a dimming switch will also turn on the lights when they are not at all necessary, for example when no one is in the room.

Conventional lighting control devices can be additionally equipped with motion sensors which measure the heat radiation of the human body as secondary measured value 4 and which react to variations in this radiation as they can occur when a person moves. A built-in time unit activates a delay in switching off the lighting after the last movement is noted. This delay is a primary nominal value 3. On page 14 of "Infel Info, Elektrizitätsanwendung in der Praxis", 1/1993, it is described that the presently registered frequency of movement in the motion sensor modifies the aforementioned delay in switching off in the newest devices in a given way.

The lighting devices described above can be further improved by employing the invented learning process. On the one hand, the brightness related switching on by a user modifies as primary nominal value 3 the designated level of brightness. The lighting is activated when the brightness remains under this level. On the other hand, accumulated experience in the chronological conduct of use changes the delay in switching off the device, which is primary nominal value 3. In the first case, for example, the brightness is used as primary measured value 2 and the status of light switch 403 is used as secondary measured value 4. In the second case, the primary measured value 2 is, for example, the clock time 203 and the secondary measured value 4 is the frequency of use, whereby the secondary nominal value 5 is a function which describes the originally given relation between frequency of use and delay in switching off the apparatus.

The following describes an exemplary procedure for execution of the invented procedure in the application in a lighting system. FIGS. 1 and 2 illustrate the procedure. The task of controlling device 1 is to autonomously turn off lighting 8 as soon as the brightness 201, 202 is "satisfactorily high", but not to autonomously turn it on again even when the brightness 201, 202 is no longer "satisfactorily high." Controlling device 1 autonomously defines the term "satisfactorily high" as well as possible. In addition, the manual switching on and off of the lighting in the usual manner must be possible by using regulating unit 403.

By means of potentiometer 404, which determines a secondary measured value 4, a function, which is determined as nominal value 5, feeds a starting value Ho for the current limiting brightness Ha, at which level the lighting system 8 switches off. Ha is a primary nominal value 3. When lighting system 8 is in operation and the brightness 201, 202 as primary measured value 2 exceeds the value Ho during a designated length of time, controlling device 1 turns lighting system 8 off automatically by means of regulating unit 7. A set of data will then be stored in EEPROM 12 with: information about the cause of the change in the status of the lighting, whereas either controlling device 1 or a user action can cause the change; with information about the status of regulation unit 7 before the change occurred; and with information about the current brightness 201, 202. If, within a designated reaction time, which can be considered as secondary measured value 4, no change in regulating unit 403 occurs, whose status is detected as secondary measured value 4, then the current limiting brightness Ha will be reduced within designated limits according to a designated algorithm, which also considers earlier stored sets of data. The occurrence of a change in regulating unit 403 within the reaction time indicates that the current limiting brightness Ha is too low. A set of data with the corresponding information will be stored as in the aforementioned switching off procedure. Once enough sets of data have been stored, the process detects a characteristic value for Ha by forming an average value from the information collected at various times about the degree of brightness when the lights turn off. The procedure modifies the algorithm used in calculating Ha in such a way that the influence of "atypical user conduct", as, for example, short-term switching on and off of lighting 8, carries less weight in adjusting Ha. The information stored in connection with user conduct at various times enables a statement to be made about "typical" or "atypical user conduct".

The process can employ time 203 as primary measured value 2 to control the lighting instead of or in addition to using brightness 201,202. This option is relevant wherever the use of lighting more likely coincides with day time, rather than with brightness 201, 202, which would be in offices with insufficient daylight. In this case, for instance, the manual operation of light switch 403 as well as a motion sensor can be employed in the form of secondary measured unit 4.

A further advantage of the invented process lies in the possibility of receiving data as measured values. Countless factors, for instance window blinds, additional sources of light, or direct sunlight can lead to complex situations in lighting a room. In such cases, controlling device 1 can detect and store information from other controlling devices. Controlling device 1 can modify the processing of further measured values 2 and 4 on the basis of this data. The devices which supply data for controlling device 1 must not necessarily be the same type as controlling device 1 itself. They simply must use a serial communication protocol which controlling device 1 recognises. Here are a few examples of such information transmitting devices: infrared remote control, modulation of the supply voltage 9 of controlling device 1 through a window blind control system, manual coding of pulse widths on a special control channel in controlling device 1.

Controlling devices 1, as they are described in the previous examples, can be built extremely compact. In particular, it is possible to include the measured values 2 and 4 with controlling device 1 due to the flexibility of such devices. Considerable savings in cost can be gained also when installing the device by integrating regulating unit 7 with the other components of controlling device 1 in a collective case.

We claim:

1. A method for minimizing the energy consumption of an electrical load controlled by a controlling device, the controlling device operating continuously throughout each day, the method comprising the steps of:

(a) processing at least one primary measured value and at least one primary nominal value to obtain a control value, the control value being output by the controlling device for controlling the flow of energy to the electrical load throughout the day; and (b) adjusting the at least one primary nominal value for individual conditions occurring throughout the day by using an output obtained by processing at least one secondary measured value and at least one secondary nominal value, the at least one secondary measured value being influenced by a user, wherein the energy consumption of the electrical load is minimized.

2. A method according to claim 1 wherein the at least one primary measured value is the time, the at least one primary nominal value is the delay in switching off the electrical load, the at least one secondary measured value is the frequency of use of the electrical load, and the secondary nominal value is a function which relates frequency of use to the delay in switching off.

3. A method according to claim 2 wherein the delay is variable.

4. A method according to claim 1 further comprising the step of:

(c) storing data associated with at least one of the at least one primary measured value, at least one primary nominal value, at least one secondary measured value and at least one secondary nominal value in a memory medium for use by the controlling device, the memory medium storing the data by time intervals which are partial intervals of typical usage periods.

5. A method according to claim 4 further comprising the step of:

(d) adjusting the at least one primary nominal value for individual conditions using stored data associated with at least one of the (i) at least one primary measured value, (ii) at least one primary nominal value, (iii) at least one secondary measured value, and (iv) at least one secondary nominal value.

6. A method according to claim 1 wherein the at least one primary measured value is the clock time, the at least one primary nominal value represents the times that the electrical load is switched off and on, the at least one secondary measured value represents the frequency of use of the electrical load, and the secondary nominal value represents the limiting value of the frequency of use.

7. A method according to claim 1 wherein the at least one primary nominal value is adjusted to switch on the electrical load prior to an expected time of usage.

8. A method according to claim 1 wherein the at least one primary measured value is brightness, the at least one primary nominal value is the limiting value for the brightness, the at least one secondary measured value is the status of a regulating unit, and the secondary nominal value is a relative value for the status of the regulating unit.

9. A controlling device for minimizing energy consumption of an electrical load, the controlling device operating continuously throughout each day, the controlling device comprising (a) a processor for (i) processing at least one primary measured value and at least one primary nominal value to obtain a control value, the control value being output by the controlling device for controlling the flow of energy to the electrical load throughout the day, (ii) processing at least one secondary measured value and at least one secondary nominal value to obtain an output value, the at least one secondary measured value being influenced by a user, and (iii) modifying the at least one primary nominal value for individual conditions occurring throughout the day by using the at least one output value; and (b) a memory medium for storing data associated with at least one of the at least one primary measured value, the at least one primary nominal value, the at least one secondary measured value and the at least one secondary nominal value, wherein the energy consumption of the electrical load is minimized.

10. A controlling device according to claim 9 wherein the memory medium is a non-volatile memory medium.

11. A controlling device according to claim 9 wherein the memory medium stores the data by time intervals which are partial intervals of typical usage periods.

12. A controlling device according to claim 9 wherein the processor modifies the at least one primary value for individual conditions using stored data associated with at least one of the (i) at least one primary measured value, (ii) at least one primary nominal value, (iii) at least one secondary measured value, and (iv) at least one secondary nominal value.

13. A machine comprising:

(a) a controlling device for minimizing energy consumption of an electrical load, the controlling device operating continuously throughout each day, the controlling device including:

(i) a processor for processing at least one primary measured value and at least one primary nominal value to obtain a control value, the control value being output by the controlling device for controlling the flow of energy to the electrical load throughout the day, processing at least one secondary measured value and at least one secondary nominal value to obtain an output value, the at least one secondary measured value being influenced by a user, and modifying the at least one primary nominal value for individual conditions occurring throughout the day by using the at least one output value, and (ii) a memory medium for storing data associated with at least one of the at least one primary measured value, the at least one primary nominal value, the at least one secondary measured value and the at least one secondary nominal value, wherein the energy consumption of the electrical load is minimized; and (b) a regulating unit for receiving the control value.

14. A machine according to claim 13 wherein the processor modifies the at least one primary value for individual conditions using stored data associated with at least one of the (i) at least one primary measured value, (ii) at least one primary nominal value, (iii) at least one secondary measured value, and (iv) at least one secondary nominal value.

* * * * *